Oct. 19, 1943. H. F. MAYNES 2,331,919
FISHING REEL
Filed April 2, 1941 3 Sheets-Sheet 1
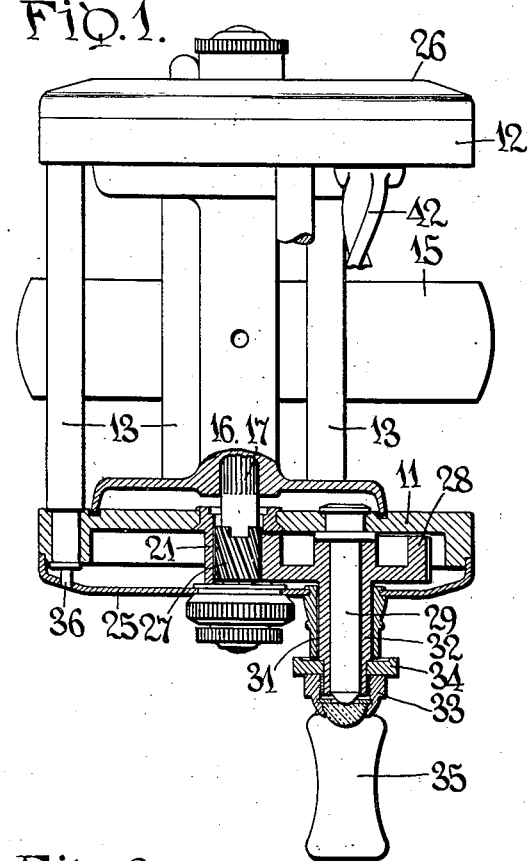
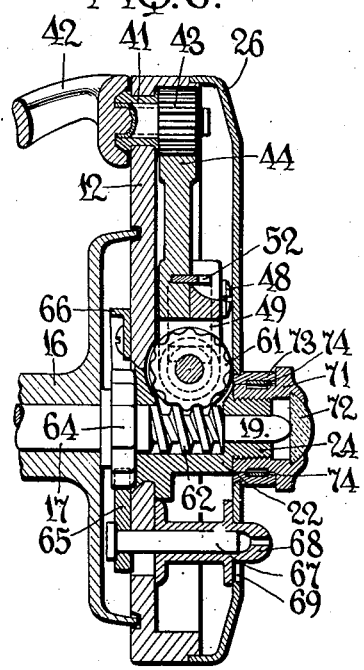
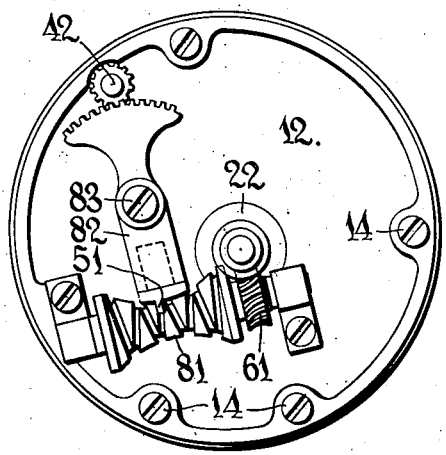
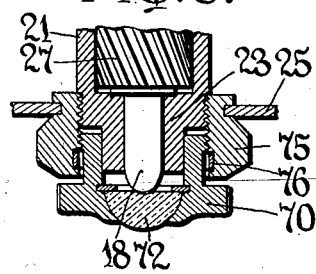
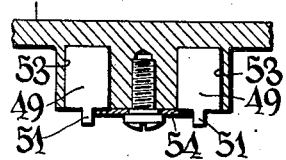
INVENTOR
Hyla F. Maynes,
BY
Beau, Brooks, Buckley + Beau.
ATTORNEYS Oct. 19, 1943.   H. F. MAYNES   2,331,919
FISHING REEL
Filed April 2, 1941   3 Sheets-Sheet 2

INVENTOR
Hyla F. Maynes,
BY
Beau, Brooks, Buckley & Beau.
ATTORNEYS

Oct. 19, 1943.  H. F. MAYNES  2,331,919
FISHING REEL
Filed April 2, 1941  3 Sheets-Sheet 3

INVENTOR
Hyla F. Maynes,
BY
Bean, Brooks, Buckley & Bean.
ATTORNEYS

Patented Oct. 19, 1943

2,331,919

UNITED STATES PATENT OFFICE 2,331,919

FISHING REEL

Hyla F. Maynes, North Tonawanda, N. Y., assignor of one-half to Emma C. Maynes, North Tonawanda, N. Y.

Application April 2, 1941, Serial No. 386,503

15 Claims. (Cl. 242—84.4)

The present invention relates to fishing reels and contemplates a rigid frame structure including end members provided with a removable cover plate housing the drive means gearing the rotatable handle to the winding spool, and, in the case of a reel having line feeding means such as a level wind shaft, a removable cover plate housing the gearing connecting the line feeding means to the spool for actuation by and upon rotation of the latter. According to the invention the bearings for the spindle of the spool are rigid with the frame end members, as distinguished from the cover plates, thereby enabling accurate alignment of the bearings without requiring accurately fitted cover plates. The bearings extend beyond the portions of the spool shaft upon which the drive gears are mounted, and by this arrangement may also be utilized to engage caps for securing the cover plates.

These and other objects and advantages of the invention, including those arising from the novel and improved arrangements of the several parts, will become apparent from the following description of the typical embodiments shown in the accompanying drawings, wherein:

Fig. 1 is a plan view of the reel with parts thereof broken away and appearing in horizontal section;

Fig. 6 is a sectional view taken approximately along line 6—6 of Fig. 4;

Fig. 7 is a fragmentary sectional view taken along line 7—7 of Fig. 4;

Fig. 8 is a fragmentary sectional view taken through the central portion of the cover plate and the associated parts at one end of the reel;

Fig. 9 is an end view similar to Fig. 4 but illustrating a modified structure;

Figure 2:
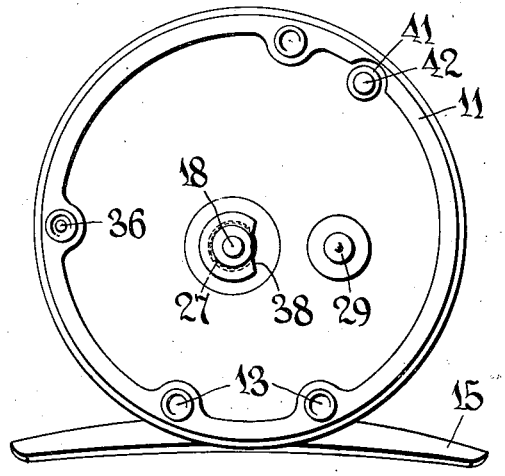
Fig. 2 is an end view of the reel with the handle carrying cover plate removed therefrom.
Figure 3:
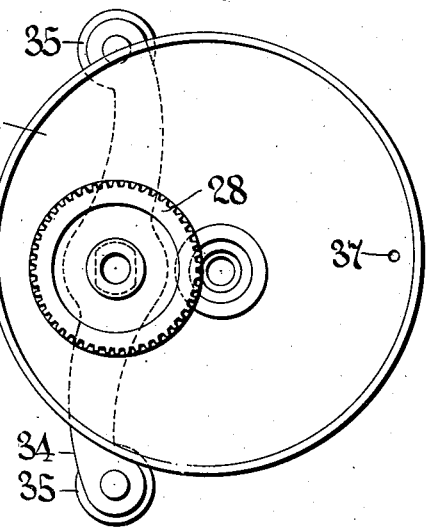
Fig. 3 is a view of the inner side of the said cover plate.

As shown in the drawings, the reel has a frame comprising end members 11 and 12 connected by pillars 13. The latter may be riveted to one end member and secured by screws 14 to the other, providing a rigid structure. Secured to the lowermost pillars is a saddle 15 for attaching the reel to a fishing rod.

Mounted in the frame between the end members is a winding spool 16 for fishing line, having a spindle 17 projecting through the end members and having a journal portion 18 adjacent the end member 11 and a journal portion 19 adjacent the end member 12.

The end members are preferably die-cast, and secured thereto, preferably by being die-cast as inserts therein, are members 21 and 22 projecting outwardly from end members 11 and 12, respectively. The members 21 and 22 have bearing parts 23 and 24, respectively, receiving the journal portions 18 and 19 of the spindle and projecting through apertures in cover plates 25 and 26, respectively, which are removably secured to the end members by caps which are screw threaded to the bearing parts 23 and 24.

Secured to the spindle between the outer face of the end member 11 and the bearing part 23, and housed in a substantially tubular part of the member 21, is a pinion 27 meshing with a drive gear 28. The latter is mounted for rotation on a stub shaft or pin 29 carried by end member 11, preferably by being die-cast as an insert therein. Extending through an aperture in the cover plate 25 and through a ferrule 31 is a tubular extension 32 from the gear 28, and to the end of extension 32 a cap screw and thrust bearing 33 secure a winding handle 34 having finger grips 35.

The end member 11 has a locating pin 36 for registry with an opening 37 in the cover plate 25. As shown in Figs. 1 and 2 the tubular portion of member 21 which houses the pinion 27 and the bearing portion 23 are cut away as indicated at 38 in Fig. 2 to permit meshing of the gear and pinion and to allow the gear to be moved axially of the pin 29 into and out of engagement with the pinion. Upon removal of the cap which holds cover 25 in place, the cover, gear 28, and handle 34 are removable as a unit from the reel.

Extending substantially parallel to the axis of the spool for feeding line evenly thereto, and journaled in bearings 41 in the end members, is a level wind shaft 42. The latter has a pinion 43 housed between end member 12 and cover plate 26. A rack 44 meshing with the pinion has bearing parts 45 slidingly engaging the outer surface of a double or reversely threaded screw 46 whose ends are journaled for rotation in bearings 47 carried by the end member 12. The portion of the rack 44 having the bearing parts 45 is formed in two sections, as shown in Fig. 6, which may be secured together over the screw 46 by fasteners 48. Within bores in the parts 45 are disposed the substantially cylindrical shanks 49 of pawls 51 which engage the threads of the screw so that upon rotation of the latter the rack will be reciprocated.

Figure 4:
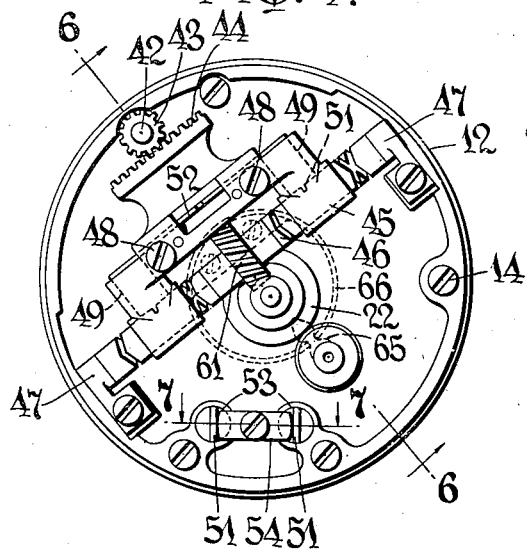
Fig. 4 is a view of the opposite end of the reel with its cover plate removed.
Figure 5:
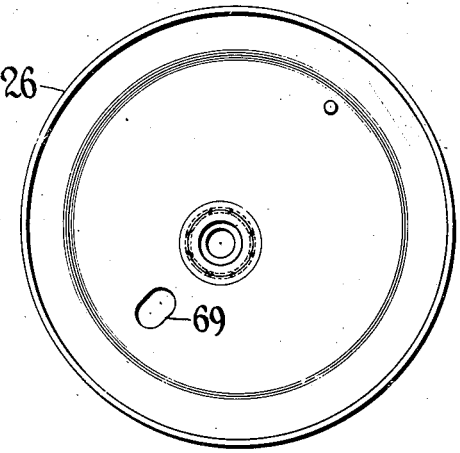
Fig. 5 is a view of the last mentioned cover plate.

For closing the outer ends of the bores, to retain the pawls 51 therein, there is provided on the rack a slide 52. The slide, normally held by friction, may be shifted endwise to uncover either bore to permit removal or replacement of a pawl. As the latter are subjected to considerable wear, spares are provided in recesses 53 in the end member 12, as shown in Figs. 4 and 7. A screw fastened retainer 54 holds the pawls against accidental displacement and may be turned about its screw fastener to effect their removal when desired.

Secured to the reversely threaded screw 46 is a worm wheel 61 meshing with a worm 62 on the spindle 17. The worm is disposed in a substantially tubular part of the member 22 between the outer face of the end member 12 and the bearing part 24, as shown in Fig. 6.

Carried by the spindle adjacent the inner face of the end member 12 is a serrated wheel 64 engageable by a clicker 65. The latter is resiliently held by a spring 66 carried by the end member, and is mounted on a pin 67 shiftable, radially of the spindle, by a finger piece 68 to carry the clicker into or out of engagement with the serrated wheel. A slot 69 for passing the element 68 is formed in the cover 26.

The cover plate 26 shown in Fig. 6 is preferably formed of spring metal, thereby to serve as a retainer for the cap 71 which is screw threaded to the bearing part 24. The cap carries a thrust bearing 72 for the spindle and is rotatably secured to a ferrule 73 on the cover plate by a non-circular spring ring 74.

The cover plate 25 may also be formed of metal and may be provided with a cap as just described. However, if the cover plates are formed of a less resilient material, such as of a molded plastic, the cap structure is preferably as shown in Fig. 8. There the cover plate 25 has rotatably connected thereto a ring 75 screw threaded to the bearing part 23 of the member 21, and to adjust the thrust bearing 72, a cap 70 is screw threaded to the ring 75. A non-circular spring ring 76 frictionally holds the cap against accidental turning.

It will be understood that in operation turning of the handle 34 will, by reason of the drive through gear 28 and pinion 27, effect a rotation of the spool 16, and this rotating movement will be transmitted, at a reduced rate, through the worm 62 and wheel 61 to the screw 46. The latter will effect reciprocation of the rack 44 which will in turn act through pinion 43 to oscillate the level wind shaft 42. Line passing over the latter will thereby be guided evenly onto the rotating winding spool in a manner well known in the art.

Removal of the cover plates 25 and 26 for cleaning or oiling the drive mechanism, or for other purposes, will not disturb the relationship of the spool, spindle and bearings as in the case of bearings carried by the cover plates, and eliminates the necessity for very accurately fitting the cover plates.

In the form of the invention shown in Fig. 9, the reversely threaded screw, indicated by numeral 81, is of substantially hour-glass form since the rack which engages the level wind shaft pinion 42 is pivoted by a screw 83 to the end member 12, and hence, oscillates angularly instead of reciprocating as does the rack 44 in the first described embodiment of the invention. The operation is substantially the same, however, the spindle of the spool having a worm which rotates worm wheel 61 affixed to the reversely threaded screw 81, and the rotation of the latter imparting an angular oscillation to the rack 82 and pinion 42.

In the form of the invention shown in Figs. 10 to 13, inclusive, the pillars connecting the end members 11 and 12 comprise opposed extensions 91 integrally formed upon the end members and joined by double screw threaded fasteners 92, with a ferrule telescoping over the adjacent ends of each pair of the opposed projections. This structure is covered by my Patent No. 2,232,253 issued February 18, 1941.

Figure 10:
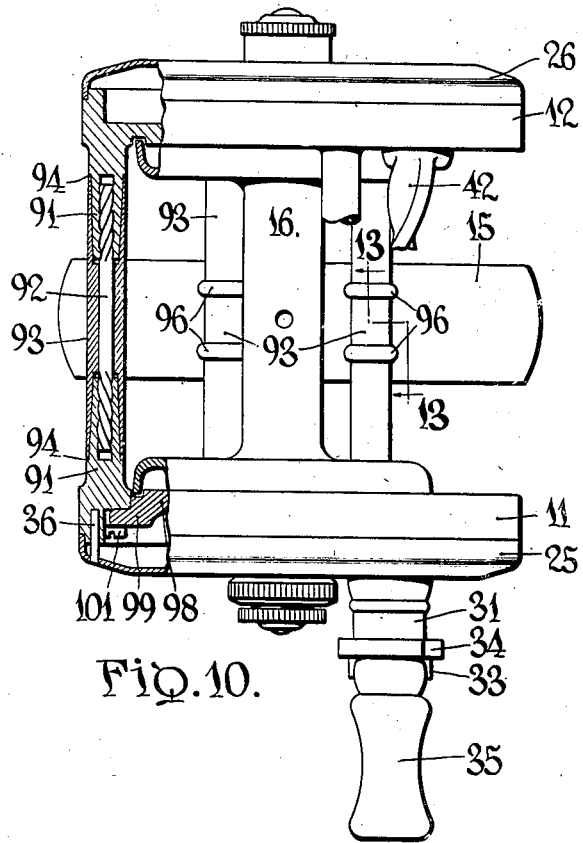
Fig. 10 is a plan view of a reel of further modified construction, with parts thereof broken away and appearing in horizontal section.
Figure 12:
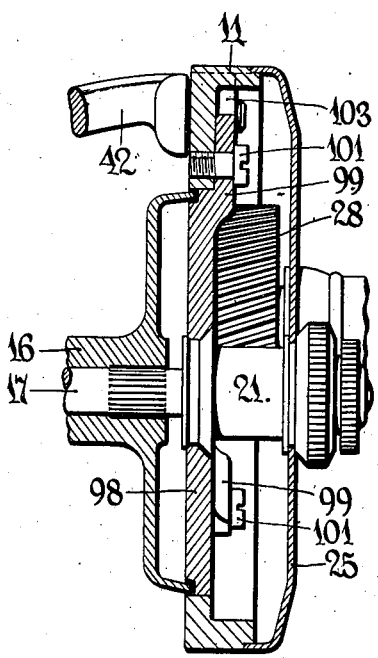
Fig. 12 is a fragmentary sectional view taken approximately along line 12—12 of Fig. 11.

As shown in Fig. 10, the extensions 91 may taper from shoulders 94 to the ends thereof, and the bore of the ferrule 93 near the ends thereof may have a corresponding taper. This will result, when the end members are assembled, in the extensions 91 becoming tightly wedged in the ferrule, rendering the frame structure very rigid.

Figure 13:
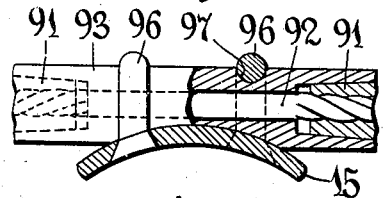
Fig. 13 is a fragmentary vertical section taken approximately along line 13—13 of Fig. 10.
Figure 11:
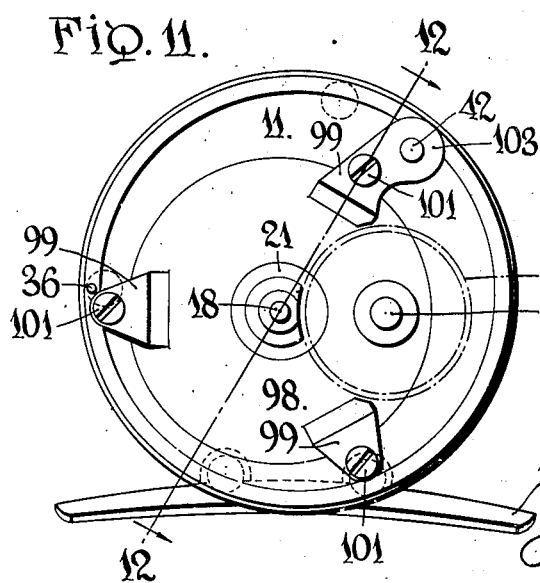
Fig. 11 is an end view of the reel of Fig. 10 with the handle carrying cover plate removed therefrom.

The ferrules of the two lower pillars may be recessed as shown in Fig. 13 to receive the saddle 15 by which the reel is attachable to a fishing rod. The saddle may be secured to these pillars by U-shaped rivets 96 whose riveted heads may be countersunk into the saddle, and whose bight portions lie in grooves 97 formed in the ferrules.

With the mode of connecting the end members employed in the structure shown in Figs. 10 to 13, disassembly of the frame is very difficult, and to enable easy removal of the spool 16 from the frame the end member 11 is provided with an opening of slightly larger diameter than the flanges of the spool so that the latter may pass therethrough, and the end member is also provided with a separate central portion 98 adapted to close the opening. This central part 98 of the end member has ears 99 through which fasteners 101 extend into the end member proper, 11.

Access to the fasteners 101 is obtained by removing the cover plate 25, and when these fasteners have been removed the part 98, together with the spindle bearing supporting member 21 carried thereby, and the spool are removable as a unit from the frame.

To enable removal of the level wind shaft 42 the end member 11 is provided with an opening large enough to pass the shaft. The opening normally is closed by a bearing 103 which may be formed integrally with and is removable with the central part 98.

Figure 14:
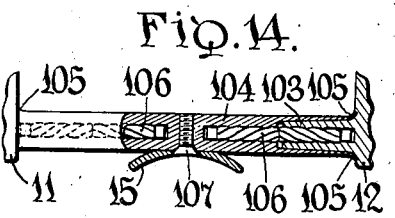
Fig. 14 is a fragmentary view, partly in section, of a still further modified construction.

In the form of the invention shown in Fig. 14, opposed tapered projections 103 are formed on the end members 11 and 12, and over each pair of these projections telescopes a pillar member 104 having the openings in its end portions tapered complementarily to the projections, and preferably having its extremities flared outwardly as indicated at 105 and seating in recesses formed in the end members. Double screw threaded fasteners 106 join the projections to the member 104, the assembly being made in accordance with my prior Patent No. 2,232,253. The saddle 15 may be secured to the lower pillar members (one of which is illustrated in Fig. 14) by screws 107.

It will be understood that the structures herein shown and described are merely illustrative of the inventive principles involved and may be otherwise embodied without departing from the spirit of my invention or the scope of the appended claims.

I claim:

1. In a fishing reel, a frame including an end member and a winding spool mounted on the frame to one side of the end member, a level wind shaft journaled in the frame with its axis of rotation substantially parallel to the axis of the spool, an extension from the end member on the side thereof opposite from the spool having a bearing part, the spool having a spindle with a journal portion in said bearing part, a worm on the spindle between the bearing and said end member, a double threaded screw having a worm wheel engaging said worm, a rack and means engaging between the rack and the threads of said screw whereby the rack is oscillated by the screw upon rotation of the latter, pinion means meshing with said rack for imparting oscillatory motion to the level wind shaft, and a cover over said end member housing said worm, worm wheel, screw, rack and pinion means, and means engaging said bearing part for securing the cover.

2. In a fishing reel, a frame and a winding spool mounted therein, a level wind shaft journaled in said frame with its axis of rotation substantially parallel to the axis of the spool, a reversely threaded screw whose axis of rotation is in a plane substantially normal to said axes of the spool and level wind shaft, drive means between said spool and said screw whereby the screw is rotated upon rotation of the spool, a member pivoted to the frame and engaging the reversely threaded screw for oscillation about its pivot upon rotation of the screw, said member having an arcuate rack portion, and pinion means associating said arcuate rack portion and level wind shaft for transmitting oscillatory movement to the latter.

3. In a fishing reel, a frame and a winding spool mounted therein, a level wind shaft journaled in said frame with its axis of rotation substantially parallel to the axis of the spool, a reversely threaded screw whose axis of rotation is in a plane substantially normal to said axes of the spool and level wind shaft, a member pivoted to the frame and engaging the reversely threaded screw for oscillation about its pivot upon rotation of the screw, said member having an arcuate rack portion, pinion means associating said arcuate rack portion and level wind shaft for transmitting oscillatory movement to the latter, and means for rotating the reversely threaded screw upon rotation of the spool.

4. In a fishing reel, a frame including an end member and a winding spool mounted on the frame to one side of the end member, a level wind shaft journaled in the frame with its axis of rotation substantially parallel to the axis of the spool, an extension from the end member on the side thereof opposite from the spool and having a bearing part, the spool having a spindle with a journal portion in said bearing part, a worm on the spindle between the bearing and end member, a double threaded screw having a worm wheel engaging said worm, a rack having a bearing portion slidably engaging the screw for reciprocation thereon, a pawl in a recess in said bearing portion for engaging the threads of the screw, a movable closure on the rack for said recess for retaining the pawl therein, and pinion means meshing with said rack for imparting oscillatory motion to said level wind shaft, the rack being movable about the axis of rotation of the screw out of engagement with said pinion means.

5. In a fishing reel, a frame having an end member, a cover plate mounted on the end member and provided with an aperture, a winding spool having a journal portion extending therefrom and a gear element between the spool and said journal portion, an extension from said end member having a bearing for said journal portion and a portion connecting the latter to the end member, a member disposed between the end member and the cover plate in meshing engagement with said gear element, and a thrust bearing secured to the cover plate, being mounted in the aperture thereof and being engageable with the end of said journal portion.

6. In a fishing reel, a frame having an end member, a cover plate mounted on the end member and provided with an aperture, a winding spool having a journal portion extending therefrom and a gear element between the spool and said journal portion, an extension from said end member having a bearing for said journal portion and a portion connecting the latter to the end member, a member disposed between the end member and cover plate in meshing engagement with said gear element, and a thrust bearing for engagement with the end of said journal portion, said thrust bearing being adjustably mounted upon said extension and being secured for rotation upon the cover plate, extending through said aperture therein.

7. In a fishing reel, a frame having an end member, a resilient cover plate removably mounted on the end member and provided with an aperture, a winding spool having a journal portion extending therefrom and a gear element between the spool and said journal portion, an extension from said end member having a bearing for said journal portion and a portion connecting the latter to the end member, a member disposed between the end member and cover plate in meshing engagement with said gear element, and a thrust bearing engageable with the end of the journal portion, said thrust bearing being adjustably screw threaded upon said extension and rotatably mounted in the aperture of said resilient cover member, the resilience of the latter permitting the thrust bearing in any adjusted position to secure it to the end member.

8. In a fishing reel, a pair of end members and a plurality of pillars therebetween, said pillars comprising opposed projections formed integrally upon each end member, said projections being tapered, ferrules having complementarily tapered bores telescoped over the adjacent ends of opposed projections, and double screw threaded fasteners extending into and connecting opposed projections.

9. In a fishing reel having an end member and a removable cover plate therefor, drive means including a detachable pawl disposed between said end member and cover plate, said drive means being accessible to permit detachment of the pawl upon removal of the cover plate, said end member having a recess for a spare pawl accessible upon removal of said cover plate, and means releasably carried by said end member for retaining a spare pawl in said recess.

10. In a fishing reel having an end member and a removable cover plate therefor, drive means including a detachable pawl disposed between said end member and cover plate, said drive means being accessible to permit detachment of the pawl upon removal of the cover plate, said end member having a pair of recesses for spare pawls accessible upon removal of said cover plate, a closure for said recesses and a fastener between said recesses pivoting said closure for swinging movement to cover or uncover said recesses.

11. In a fishing reel, a frame having an end member, a removable and resilient cover plate for the end member, the end member having a projection, a spindle extending through the projection, and a thrust bearing adjustably screw threaded on said projection and mounted for rotation on the cover plate, the thrust bearing in the adjusted positions thereof holding the cover plate against the end member by reason of the resilience of said cover plate.

12. In a fishing reel, a frame having an end member provided with a projection, a spindle journaled by the projection, a cover plate for the end member having an aperture through which said projection extends, an element rotatably mounted in said aperture, said element having a portion for abutment with said cover member and being screw threaded to the projection for removably securing the cover plate to the end member, and a thrust bearing part for the spindle carried by said element.

13. In a fishing reel, a frame having an end member provided with a projection, a spindle extending through the projection, a cover plate for the end member, an element rotatably mounted upon the cover plate and screw threaded to the projection for securing the cover plate to said end member, and a thrust bearing for the spindle adjustably screw threaded to said element.

14. In a fishing reel, a frame having a pair of end members and a plurality of pillars therebetween, a spool disposed between said end members, said pillars comprising projections formed integrally upon each end member, said projections being tapered, ferrules having complementarily tapered bores telescoped over the adjacent ends of opposed projections, double screw threaded fasteners extending into and connecting opposed projections, one of said end members having an opening therethrough sufficiently large to pass said spool and an element detachably secured over said opening and carrying a bearing member for journalling the adjacent end of the spool.

15. In a fishing reel, a frame having an end member, a removable and resilient cover plate mounted on the end member and provided with an aperture, a winding spool and a spindle therefor, said spindle having a journal portion, a gear element on the spindle between the winding spool and said journal portion, a bearing member carried by said end member, said bearing member having projecting from the end member a tubular portion housing said gear element and a bearing portion receiving the journal portion of the spindle, said bearing portion extending through the aperture in the cover plate, a second gear element housed between said end member and cover plate and in meshing engagement with the first mentioned gear element, said tubular portion being cut away to permit such meshing engagement, and a thrust bearing adjustably screw threaded onto said bearing portion and mounted for rotation in said aperture, said thrust bearing being engageable with the end of said spindle and having a portion thereof engageable against the cover plate to secure the same against the end member in various adjusted positions of the thrust bearing by reason of the resilience of said cover plate.

HYLA F. MAYNES.